(12) United States Patent
Pawellek et al.

(10) Patent No.: US 9,119,274 B2
(45) Date of Patent: Aug. 25, 2015

(54) RESONANT CONVERTER CONTROL

(75) Inventors: Alexander Pawellek, Stadtlauringen (DE); Juergen Stahl, Herrieden (DE); Jens Goettle, Erlangen (DE); Thomas Duerbaum, Baiersdorf (DE); Frans Pansier, Nuenen (NL); Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/131,648

(22) PCT Filed: Jul. 3, 2012

(86) PCT No.: PCT/EP2012/062888
§ 371 (c)(1),
(2), (4) Date: Mar. 13, 2014

(87) PCT Pub. No.: WO2013/010782
PCT Pub. Date: Jan. 24, 2013

(65) Prior Publication Data
US 2014/0210370 A1    Jul. 31, 2014

(30) Foreign Application Priority Data
Jul. 15, 2011    (EP) .................................... 11250661

(51) Int. Cl.
H05B 37/02    (2006.01)
H05B 41/36    (2006.01)
H05B 41/282    (2006.01)

(52) U.S. Cl.
CPC ............ *H05B 41/36* (2013.01); *H05B 41/2828* (2013.01)

(58) Field of Classification Search
CPC ......... H05B 37/02; H05B 41/36; H05B 41/39
USPC ............ 315/209 R, 224–226, 246, 287, 291, 315/294, 360
See application file for complete search history.

(56) References Cited

U.S. PATENT DOCUMENTS

| 4,949,016 A | 8/1990 | De Bijl et al. |
| 5,525,872 A | 6/1996 | Achten et al. |

(Continued)

FOREIGN PATENT DOCUMENTS

| CA | 2 574 124 A1 | 2/2006 |
| CN | 101060743 A | 10/2007 |

(Continued)

OTHER PUBLICATIONS

Deng, E. et al, "Negative Incremental Impedance and Stability of Fluorescent Lamps", Applied Power Electronics Conf. and Exposition, vol. 2, pp. 1050-1056, (Feb. 1997).

(Continued)

*Primary Examiner* — Tung X Le

(57) ABSTRACT

The invention relates to methods of controlling operation of a resonant power converter and to controllers configured to operate according to such methods. Embodiments disclosed include a method of controlling a power output of a resonant power converter comprising first and second switches (S1, S2) connected in series between a pair of supply voltage lines, a resonant circuit connected to a node between the first and second switches and to an output connectable to an output electrical load, the resonant circuit comprising an inductor and a capacitor, the method comprising: closing the first switch (S1) to start a first conduction interval; setting a first voltage level (902); setting a first time period; and opening the first switch (S1) to end the first conduction interval when a voltage (901) across the capacitor crosses the first voltage level (902) and when a time period from closing the first switch exceeds the first time period (904).

10 Claims, 13 Drawing Sheets

(56) References Cited

U.S. PATENT DOCUMENTS

| | | | |
|---|---|---|---|
| 5,677,602 A * | 10/1997 | Paul et al. | 315/224 |
| 5,959,410 A * | 9/1999 | Yamauchi et al. | 315/209 R |
| 6,385,068 B2 | 5/2002 | Aenderkerk et al. | |
| 6,445,140 B2 | 9/2002 | Buij et al. | |
| 6,963,178 B1 * | 11/2005 | Lev et al. | 315/307 |
| 7,755,296 B2 | 7/2010 | Yang et al. | |
| 2005/0035729 A1 | 2/2005 | Lev et al. | |
| 2006/0057781 A1 | 3/2006 | Shiffer | |
| 2010/0033101 A1 | 2/2010 | Yamamoto et al. | |
| 2011/0058915 A1 | 3/2011 | Scroggie et al. | |
| 2013/0016533 A1 | 1/2013 | Halberstadt | |
| 2013/0163215 A1 | 6/2013 | Sun | |

FOREIGN PATENT DOCUMENTS

| | | |
|---|---|---|
| CN | 101534595 A | 9/2009 |
| EP | 1 615 478 A1 | 11/2006 |
| EP | 2 547 176 A1 | 1/2013 |
| GB | 2 178 789 | 2/1978 |
| GB | 2 306 062 A | 4/1997 |
| WO | 2005/112238 A2 | 11/2005 |
| WO | 2006/010360 A2 | 2/2006 |
| WO | 2006/103609 A2 | 10/2006 |
| WO | 2009/004582 A1 | 1/2009 |
| WO | 2009/037613 A1 | 3/2009 |
| WO | 2009/098640 A1 | 8/2009 |

OTHER PUBLICATIONS

Tao, F., "Advanced High-Frequency Electronic Ballasting Techniques for Gas Discharge Lamps", Electrical and Computer Engineering, Virginia Polytechnic Institute and State University, 193 pgs. (2001).

Wang, C. et al., "A Novel Single-Stage High-Power-Factor Electronic Ballast With Symmetrical Half-Bridge Topology", IEEE Trans. on Industrial Electronics, vol. 55, No. 2, pp. 969-97 2 (2006).

European Power Supply Manufacturers Association, "Harmonic Current Emissions, Guidelines to Standard EN 61000-3-2", pp. 1-9 (Nov. 8, 2010).

International Search Report and Written Opinion for Int'l. Patent Application No. PCT/EP2012/062888 (Mar. 4, 2013).

* cited by examiner

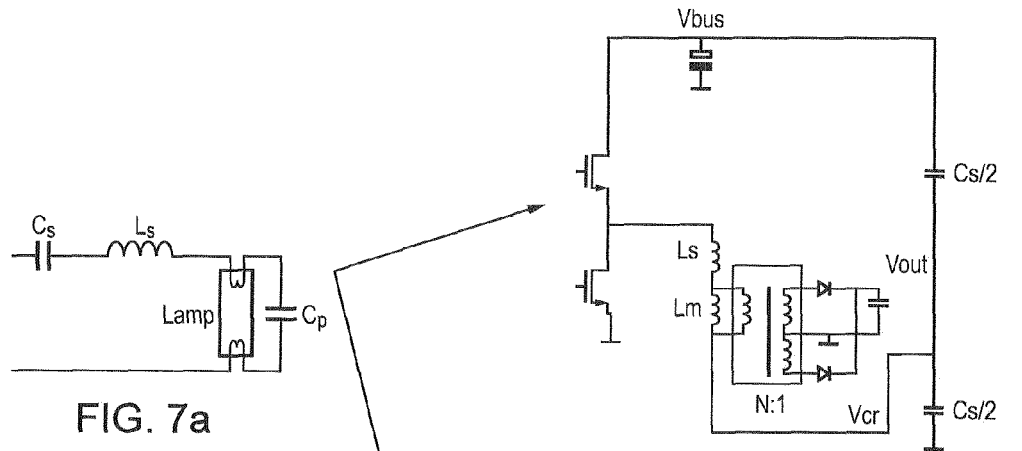
FIG. 7a
FIG. 7b
FIG. 7c
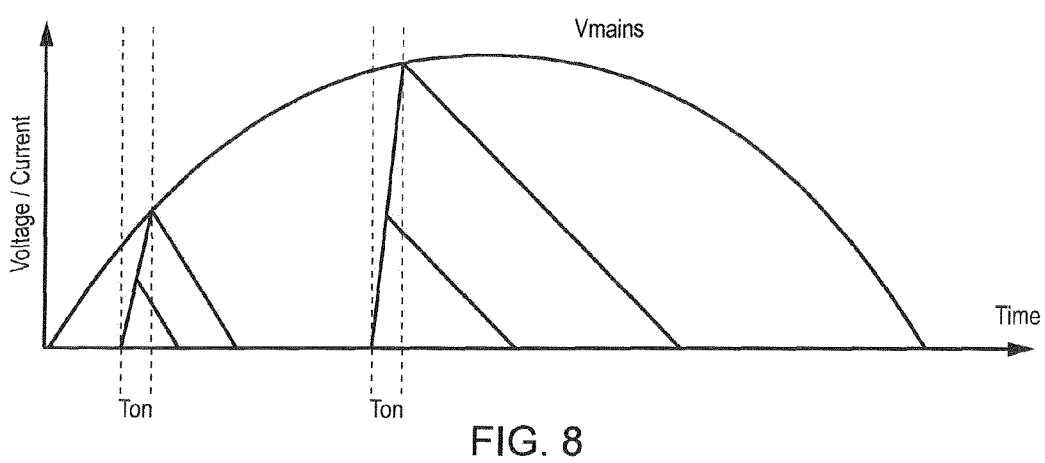
FIG. 8

RESONANT CONVERTER CONTROL

The invention relates to methods of controlling operation of a resonant power converter and to controllers configured to operate according to such methods.

The use of gas discharge lighting has become more prevalent and is likely to continue increasing due to advantages related to energy consumption compared with traditional incandescent lighting. However, gas discharge lighting requires a different type of electrical power source compared with incandescent lighting. A block diagram of a basic fluorescent light driver 100 is illustrated in FIG. 1. An AC input 101 is connected to a rectifier 102, which provides a rectified signal to a storage capacitor 103. Energy is typically stored in the storage capacitor 103 around the peak voltage of the AC input in each half cycle. A ballast circuit 104 drives a half bridge switching circuit 105 with a switching signal and the half bridge switching circuit 105 drives a resonant circuit 106 connected to a light fitting 107.

Compact fluorescent lighting (CFL), where fluorescent lights are used as direct replacements for existing incandescent light fittings, provide a particular challenge in that all of the components necessary for driving the lamp, together with the fluorescent lamp itself (i.e. components 102 to 107 of FIG. 1), are required in a package size preferably no larger than an existing incandescent light bulb.

Fluorescent lighting is usually non-dimmable due to the different power source requirements, which is a disadvantage compared to conventional incandescent lighting. Dimmable solutions are therefore required. In addition, power factor requirements for fluorescent lighting, which tend to present reactive rather than purely resistive loads, are becoming tighter as their use increases.

Existing solutions for fluorescent lighting drivers tend to use frequency as a way of controlling the power delivered to the lamp 107, by using the variation in energy transfer through a resonant converter circuit with frequency. One issue with frequency control however is stability, in particular when dimming to low levels, due to the non-uniform impedance characteristics of fluorescent lamps. This type of characteristic makes stability of control of the power output problematic, because it is the derivative of the impedance which determines the loop gain of a frequency control loop. This problem is discussed by Deng et al. in "Negative Incremental Impedance and Stability of Fluorescent Lamps", Applied Power Electronics Conference and Exposition 1997 (APEC '97), 23-27 Feb. 1997, pp 1050-1056, vol. 2, in which it is shown that behaviour of a voltage source causes instability of the converter output due to the lamp characteristics of a CFL, arising from the negative slope of a steady state voltage-current curve. Stability can be obtained using a series impedance or feedback of lamp current to a frequency control input. In practical applications however it is particularly difficult to define the proper conditions for such feedback over an entire dimming range and for a range of different lamps. An alternative is to use a control method that uses the difference in time between a time interval during which one switching element of a half bridge is conducting during a half cycle of a periodic voltage and a time interval during which a diode is conducting during the same half cycle.

A change in lamp resistance during ignition can cause a change in operation to where the body diodes of the resonant converter switches become forward biased when turned off, such that the resonant tank operates in a so-called capacitive mode. Measures are required to rapidly change the output provided to the lamp to keep a driving circuit out of such a capacitive mode, which can result in destruction of the switching elements. In conventional methods of controlling power to gas discharge lamps, frequency control methods tend to momentarily sweep the frequency to a higher value to avoid the occurrence of a capacitive mode. This limits the problem, although by sweeping the frequency a dip in the delivered power occurs, which can turn the lamp off. A capacitive mode for a resonant power supply can be avoided by keeping the operating frequency of the converter just within a "safe" side of a capacitive mode region, but while maintaining the maximum power possible. This can be realised by turning a conducting switch off before the current turns to zero in order to maintain sufficient energy to obtain a soft switching action of the opposite switch. The opposite switch may also be prevented from turning on as long as the current is not in the proper direction. This prevents charge build up in the body diode of the previous conducting switch being recovered in an uncontrolled way, which risks destruction of the switch.

Power factor correction is another requirement that needs to be addressed for gas discharge lamps, in particular for CFL applications above 25 W (according to Guidelines on Harmonic Current Emissions, EN 61000-3-2, issued by the European Power Supply Manufacturers Association, 8 Nov. 2010). Additional circuitry may therefore be necessary to improve the power factor of a CFL assembly. To reduce costs and the overall size of the assembly, single stage solutions are preferred. An advantage of such solutions is the use of a smaller number of components and sometimes a higher efficiency. A disadvantage is that the operating frequency is used for regulation of power delivered to the lamp, and the effect on the power factor correction stage and the resonant stage is different, making control considerably more difficult. Exemplary circuits for driving a gas discharge lamp 211 using a resonant converter with and without a transformer are illustrated in FIGS. 2a and 2b. FIG. 2a illustrates a circuit topology using a bridgeless boost, i.e. using the supply voltage Vs to provide power directly to the lamp 211, while FIG. 2b illustrates a topology with a 1:n transformer 212, which allows the supply voltage Vs to be transformed to a different level. This general type of topology combines a half bridge driver with a power factor correction (PFC) function obtained using the same switches $S_1$, $S_2$. Electrical power provided to the gas discharge lamp 211 may be controlled by using a symmetrical 50% duty cycle switching scheme for the first and second switches $S_1$, $S_2$ and varying the switching frequency.

Other similar single stage PFC topologies, used for driving gas discharge lamps, are illustrated in FIGS. 3, 4 and 5, FIG. 3 showing a single-stage PFC electronic ballast, FIG. 4 a single-stage interleaved PFC electronic ballast, and FIG. 5 a single-stage critical-conduction-mode PFC electronic ballast. Further details relating to these and other circuits, together with their operation, are described in "Advanced High-Frequency Electronic Ballasting Techniques for Gas Discharge Lamps", by Fengfeng Tao, Virginia Polytechnic Institute and State University, 2001, the disclosure of which is incorporated by reference herein.

When dimming a gas discharge lamp and maintaining a switching scheme having a 50% duty cycle, unstable behaviour can occur, particularly when dimming to low levels. A 50% duty cycle is generally preferred in existing solutions since asymmetrical control of a gas discharge lamp, even if the DC component of the driving signal is zero, can lead to a gradual shifting of the concentration of ions in the gaseous medium (e.g. mercury in the case of commonly used fluorescent lamps) towards one electrode, resulting in a shortened lifetime for the lamp. Prior solutions to these problems are described in U.S. Pat. No. 6,445,140 and U.S. Pat. No. 6,385,068, in which asymmetrical switching schemes are used, the asymmetry being reversed during successive periods to prevent concentration of ions towards one electrode. A problem with such solutions however is the higher effort required in implementing the switching scheme.

A disadvantage of the single stage boost topologies shown in FIGS. 2 to 5 is that for regulation of power only the operating frequency can be varied, which results in differing effects on power factor correction and resonant behaviour. This can lead to a dramatic rise in the bus voltage at low dimming levels. A further disadvantage is that, when operating with a symmetrical duty cycle, the supply voltage should be higher than twice the peak value of the AC mains supply, thereby limiting the practical use of such boost circuits to low voltage mains applications.

Asymmetrical control of single stage PFC resonant converters may be used to suppress the bus voltage and expand the dimming range, as for example described by Tao (see above), from which FIGS. 6a and 6b are taken. FIG. 6a shows an example of a single stage PFC resonant converter, and FIG. 6b indicates the voltage and current signals for the converter over a switching cycle. The switching duty cycle is varied such that the on time of switch S1 is made longer than the on time of switch S2, thereby changing the output current flowing through the lamp. Further details of the operation of this circuit can be found in section 3.4.3 of Tao.

Asymmetrical control can be used to vary the power delivered by a resonant converter without changing the frequency of operation, due to the first harmonic content being lower at a lower duty cycle. This in turn results in a lower amplitude of output current and therefore lower power. Asymmetrical control can however cause the loss of soft switching behaviour at low dimming levels, resulting in additional losses and electromagnetic interference problems, as also described for example by Tao.

As well as gas discharge lamp applications, a single stage PFC resonant converter may also be used for providing a DC output voltage, for example in power adaptor applications. In such applications, an LLC topology may be used. The single stage topologies discussed above may be converted to AC-DC converters by replacing the resonant tank. This is illustrated in FIGS. 7a-c. FIG. 7a shows the resonant tank and lamp from the circuit of FIG. 2a, while FIGS. 7b, 7c show two alternative resonant converter circuits to that of FIG. 2a configured to provide a rectified DC output by use of a N:1 transformer with rectifying diodes and a smoothing capacitor on the output side of the transformer. The resonant capacitor Cs may be positioned in one of two different ways in such a circuit, either in series with the input side inductors Ls, Lm as in FIG. 7c or split between the bus voltage line and ground as two Cs/2 capacitors, as in FIG. 7b. Other variations are possible, for example by placing the resonant capacitor at different places in the main current path, such as in series with the half bridge node. Operation of such LLC type converters is described further in WO 2005/112238, WO 2009/004582 and WO 2009/098640.

It is an object of the invention to address one or more of the above mentioned problems.

In accordance with a first aspect of the invention there is provided a method of controlling a resonant power converter comprising first and second switches connected in series between a pair of supply voltage lines and a resonant circuit connected to a node between the first and second switches and to an output connectable to an output electrical load, the resonant circuit comprising an inductor and a capacitor, the method comprising:

closing the first switch to start a first conduction interval;
setting a first voltage level;
setting a first time period; and
opening the first switch to end the first conduction interval when a voltage across the capacitor crosses the first voltage level and when a time period from closing the first switch exceeds the first time period. In other words, the first switch is opened at a moment that is defined by when the voltage across the capacitor crosses the first voltage level, but only when the time period from closing the first switch has been exceeded.

An advantage of the invention is that the combination of two criteria of the first voltage level and first time period having to be met before ending the first conduction interval provides a further independent control over the overall power converted during operation of the converter. This allows for improved control over the output power, particularly at low levels. This is particularly advantageous in respect of dimming gas discharge lamps, although may also be used for applications where a DC output is required or for driving reactive loads other than gas discharge lamps.

The first time period may be longer than a resonant period of the resonant circuit. In other words, the first time period may be greater than $1/f$, where f is the operational resonant frequency of the resonant circuit, which is typically defined by the LC combination of the resonant circuit comprising the inductor and capacitor but not including any magnetising inductance in the transformer. The circuit is thereby enabled to end the first conduction interval beyond the point at which the voltage across the capacitor first crosses the first voltage level, extending the conduction interval until a subsequent point at which the voltage crosses the first voltage level. The result of this is a reduction in power converted over the first conduction interval.

In preferred embodiments, the resonant power converter has a single stage PFC resonant topology, where an advantage is that a match is allowed between the converted power of both a PFC stage and the resonant stage, particularly at low power output levels. This allows the resonant power converter to be operable over a wider range of power levels while maintaining the bus voltage within acceptable limits and without losing soft switching performance.

Where the resonant power converter forms a driving circuit for a gas discharge lamp, the use of capacitor voltage control allows the converter to maintain stable operation of the lamp during deep dimming. The lamp can also be driven symmetrically over subsequent half cycles, thereby preventing undesirable ion migration in the lamp.

In accordance with a second aspect of the invention there is provided a resonant power converter comprising first and second switches connected in series between a pair of supply voltage lines, a resonant circuit connected to a node between the first and second switches and to an output connectable to an output electrical load, the resonant circuit comprising an inductor and a capacitor, the resonant power converter further comprising a switching controller configured to operate the first and second switches over successive switching cycles by:

closing the first switch to start a first conduction interval;
setting a first voltage level;
setting a first time period; and
opening the first switch to end the first conduction interval when a voltage across the capacitor crosses the first voltage level and when a time period from closing the first switch exceeds the first time period.

As with the first aspect of the invention, the first time period may be longer than a resonant period of the resonant circuit. The resonant power converter may be in the form of a single stage PFC topology. The resonant power converter may form part of a driving circuit for a gas discharge lamp. The switching controller may be configured to:
- close the second switch to start a second conduction interval after the first switch is opened;
- set a second voltage level;
- set a second time period; and
- open the second switch to end the first conduction interval when a voltage across the capacitor crosses the second voltage level and when a time period from closing the second switch exceeds the second time period.

Embodiments of the invention may be implemented on resonant power converters having topologies as shown in FIGS. 2 to 7, where a switching controller provides the signals required for operating the first and second switches in accordance with preset voltage levels and timing levels determined according to the required power output and operated in response to signals measured across a sensing capacitor, such as the capacitor Cs in FIGS. 2a and 2b.

The invention will now be described in further detail, with reference to the accompanying drawings in which:

FIG. 7a is a diagram of a resonant tank and lamp part of the circuit diagram of FIG. 2a;

FIG. 7b is a circuit diagram of a first alternative resonant converter;

FIG. 7c is a circuit diagram of a second alternative resonant converter;

FIG. 8 is a schematic diagram illustrating the waveform of an output current compared to an input mains voltage over a half cycle;

A converter according to embodiments described herein operates in a mode that allows the converter to draw an almost sinusoidal current from a mains supply, thereby presenting a high power factor, while at the same time allowing a delivered power to be controlled over a wide range. This is achieved by controlling the output power using two independent variables. The first variable defines the converted energy per switching cycle, while the second variable defines a repetition time. The resulting converted power is then determined by the energy per cycle divided by a repetition time.

For a resonant converter operating according to a 50% duty cycle operation, the relationship between frequency and power for a given input and output voltage is sensitive to small changes in frequency. This is especially the case for an LLC converter operating close to a continuous current mode (CCM) of operation (also known as the load independent point), where theoretically there is only one operating frequency in steady state where the converter is capable of delivering a full power range.

For power factor correction, if operating at a given output voltage, a given operating frequency and operating according to a discontinuous current mode (DCM) of operation, the output current is in the form of a triangular waveform with a peak value that is proportional to the momentary mains voltage and is proportional to the on time during the interval where the PFC current is build up. This is shown schematically in FIG. 8, where the time scale for the PFC current is enlarged to illustrate this.

Due to the steep relationship between frequency and power of the resonant converter, the on time is almost fully defined by the resonant converter when using a 50% duty cycle mode. Using this on time for the PFC and assuming a certain repetition time directly results in a certain power transferred by the PFC over a half cycle of a mains voltage cycle. This power in turn directly defines the power of the resonant converter. In this way, the level for the first variable (converted energy per cycle) is set. For PFC boost type converters such as those illustrated in FIGS. 2 and 3, the converted energy per cycle for the PFC is also proportional to the square of the mains voltage Vmains(t). The power output may therefore be more accurately described in terms of the average converted energy per cycle over a mains voltage cycle, given that the converted power of the PFC varies more over a mains cycle than for the resonant converter.

A second variable of a time period can now be used to regulate the power level further. When the converted energy level for both the PFC and resonant converter is kept fixed, both converted powers will be kept matched when increasing the repetition time. This allows the bus voltage Vbus to be kept constant over different loads, resulting in an advantage over other solutions.

Figure 9:
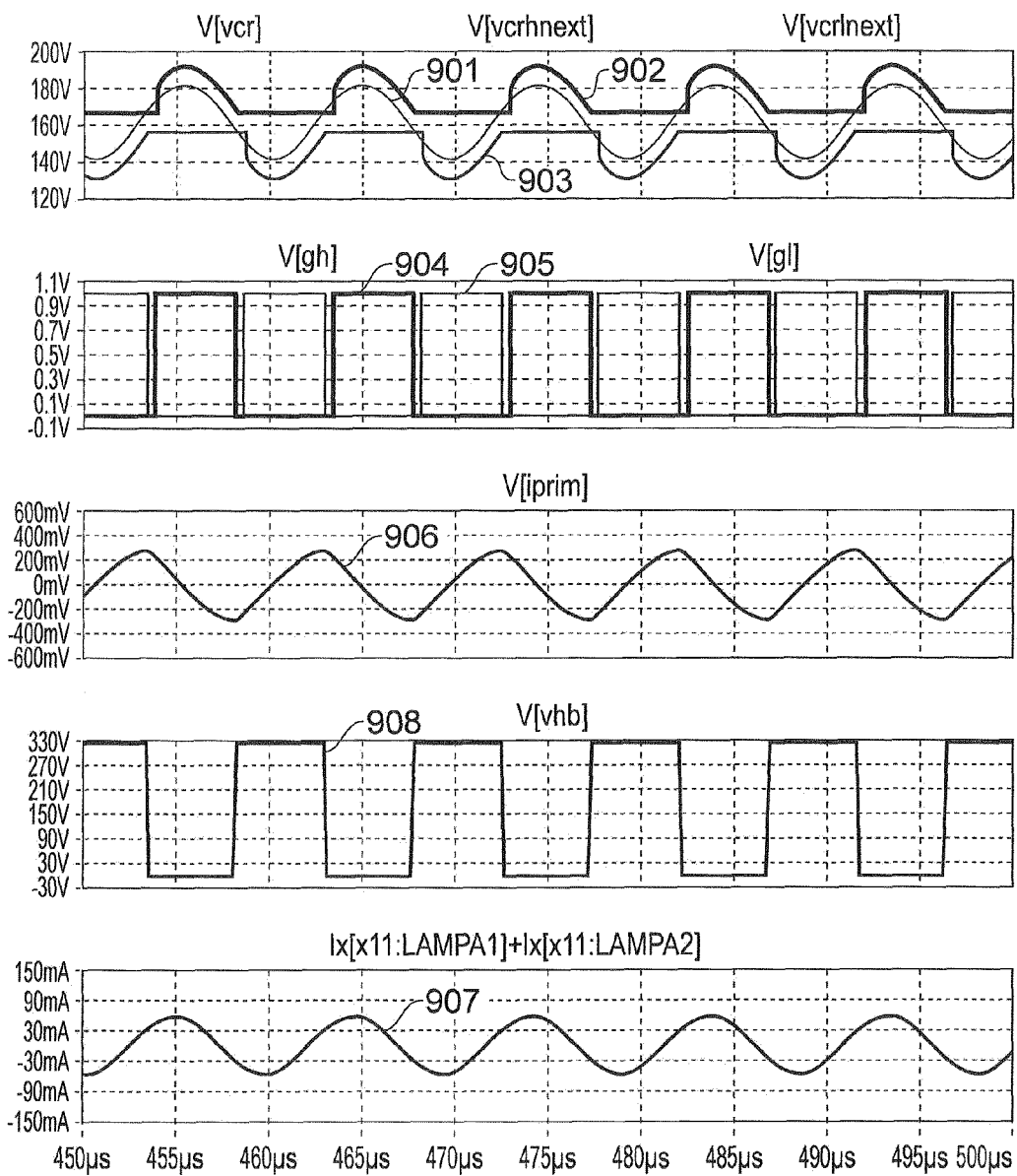
FIG. 9 is a plot of voltage and current waveforms during operation of an exemplary gas discharge lighting ballast at a first power level using a 50% switching duty cycle.
Figure 10:
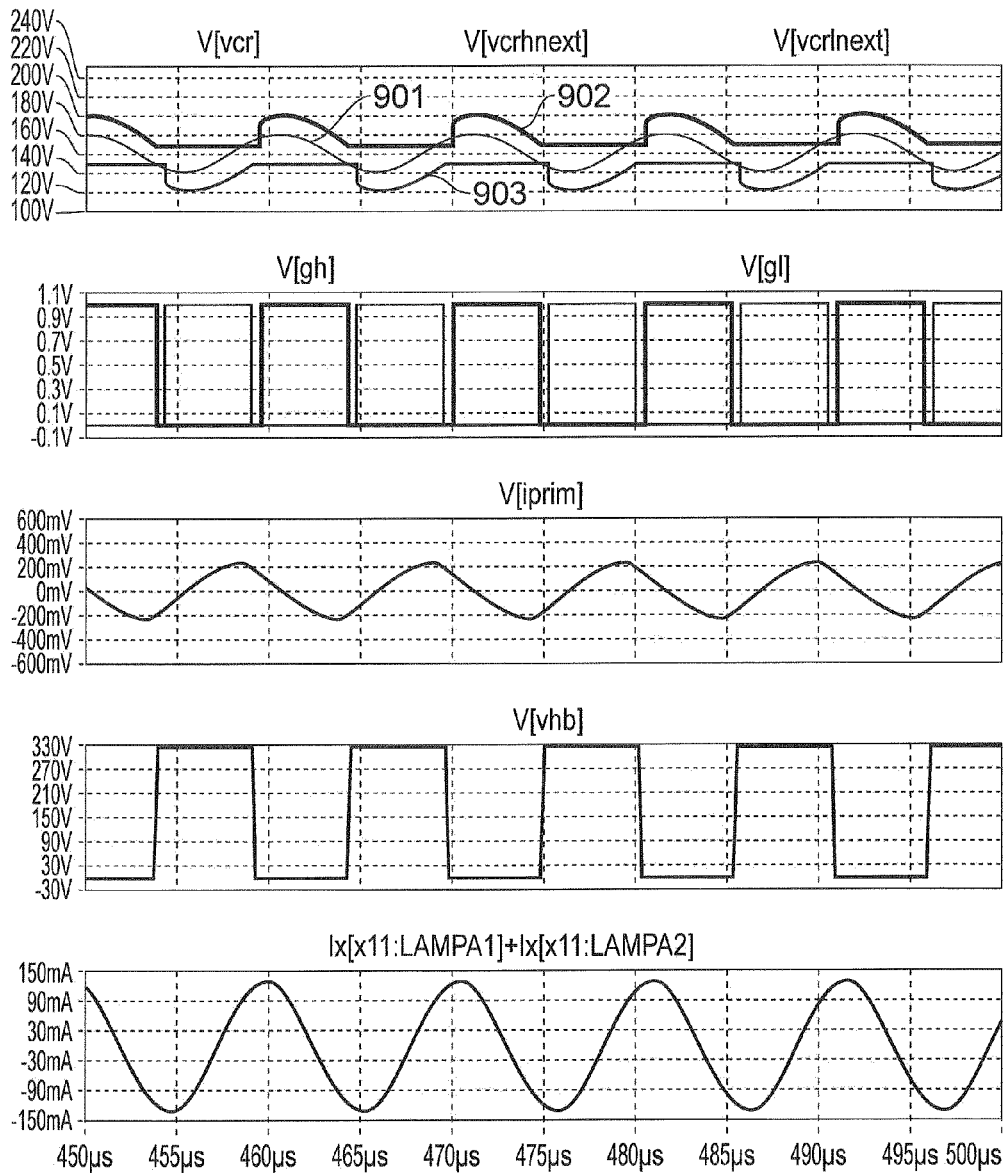
FIG. 10 is a plot of voltage and current waveforms during operation of an exemplary gas discharge lighting ballast at a second power level using a 50% switching duty cycle.

In the case of gas discharge lamp ballast applications, FIGS. 9 and 10 show how the first variable (corresponding to the converted energy per cycle) can be set for the lighting ballast application, in this case using a voltage across the resonant capacitor to control the timing of the switches. The upper plot in FIG. 9 shows the voltage V(vcr) 901 across the resonant capacitor. The converted energy per cycle in this embodiment is set by forcing a voltage difference deltaV for V(vcr) between the beginning and end of each switching conduction interval. The variables V(vcrhnext) 902 and V(vcrinext) 903 are used to set the desired voltage difference. As soon as deltaV becomes larger than a set point, i.e. when V(vcr) crosses V(vcrhnext) or V(vcrinext), the conducting switch for the respective conduction cycle is turned off, and the next half cycle commences. For the example of FIG. 9, deltaV is set to 10V and for the example of FIG. 10 deltaV is set to 20V (note that the scales in each figure are different). A 50% switching duty cycle is in this case created by sensing the DC component of the voltage across the capacitor in series with the lamp and changing deltaV for each opposite half cycle if this DC component differs from a desired value (which is equal to Vbus/2 for a 50% duty cycle operation).

The plots in FIGS. 9 and 10 also show voltage waveforms V(gh) 904, V(gl) 905 corresponding to the high side and low side switching intervals. In this case, the minimum waiting times are set to be less than the time taken for the criterion of V(vcr) crossing either V(vcrhnext) 902 or V(vcrhnext) 903 to be met. The resulting primary current is indicated by the voltage waveform V(iprim) 906 and the lamp current 907 is sinusoidal. The voltage V(vhb) 908 at the half bridge node between the first and second switches is in the form of a square wave with equal half cycle periods.

Figure 11:
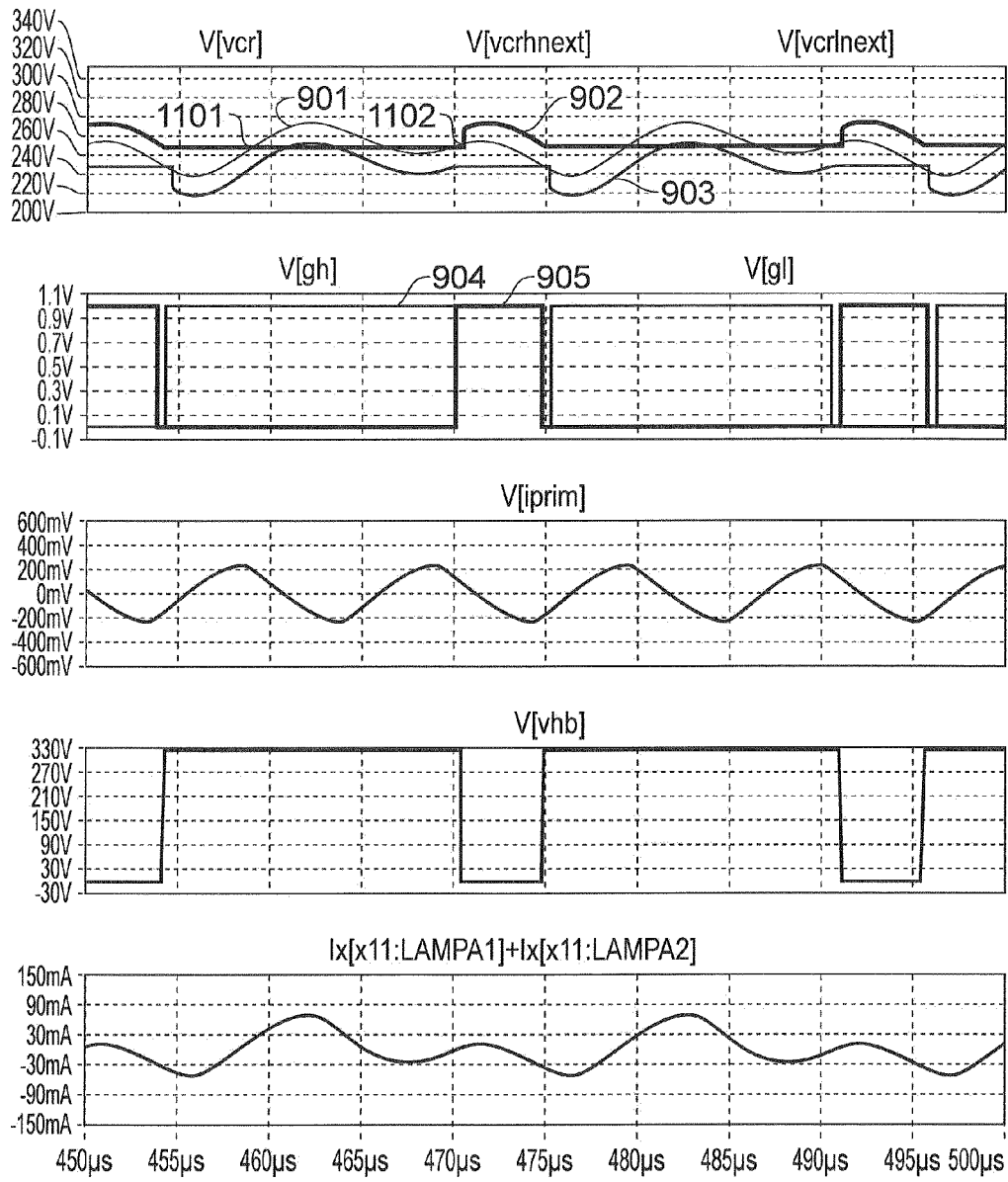
FIG. 11 is a plot of voltage and current waveforms during operation of an exemplary gas discharge lighting ballast with a first minimum waiting period between the start and end of a switching interval.
Figure 12:
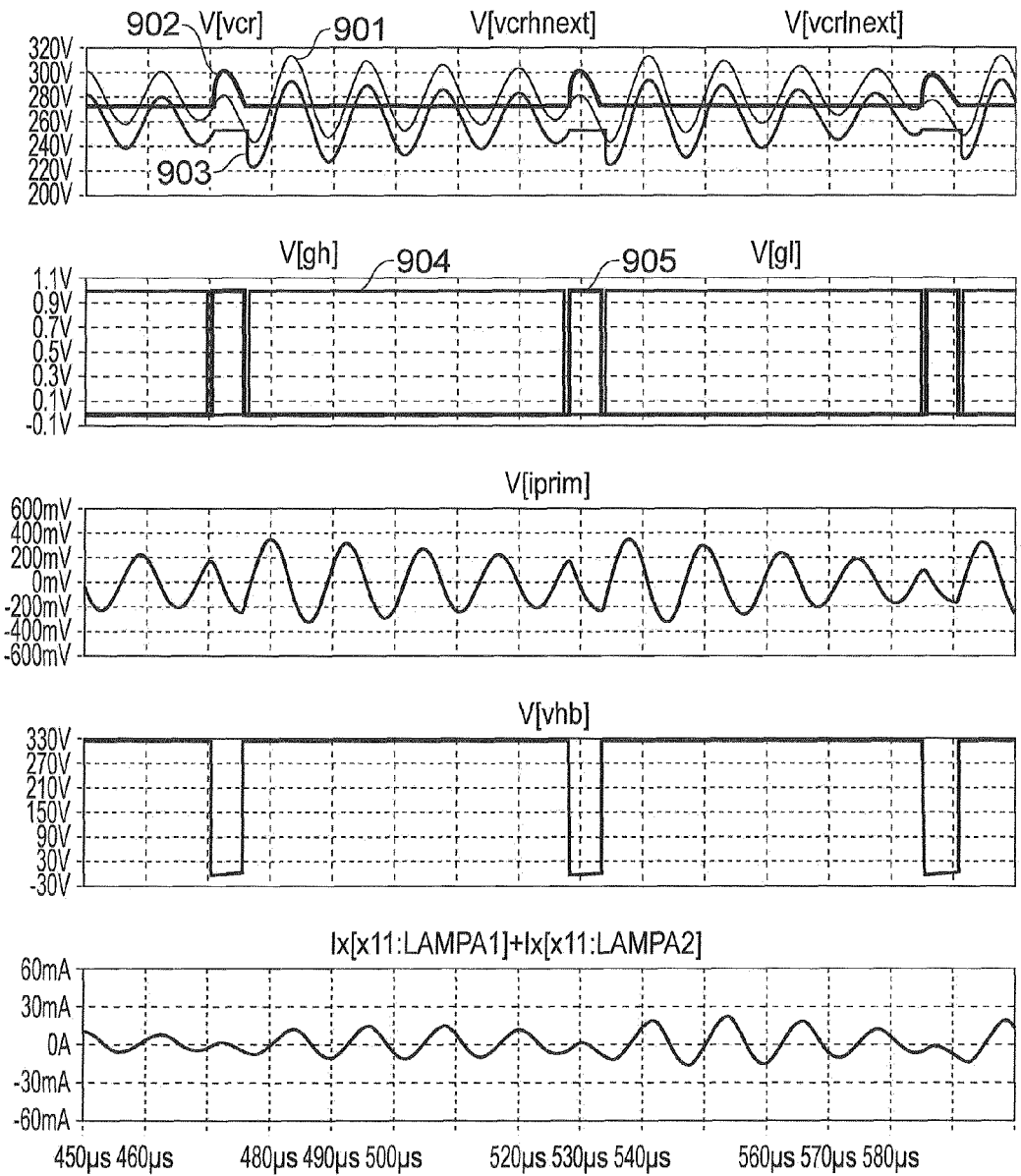
FIG. 12 is a plot of voltage and current waveforms during operation of an exemplary gas discharge lighting ballast with a second waiting period between the start and end of a switching interval.

Extending the second variable in the form of the minimum waiting time, and using this in conjunction with the first criterion defined by the first deltaV variable, results in the plots of voltage and current waveforms illustrated in FIGS. 11 and 12.

Turning to FIG. 11, the level for V(vcr) 901 where the upper switch should be turned off is determined by the signal Vcrhnext 902. The moments where V(vcr) 901 crosses V(vcrhnext) are in FIG. 11 at t=459 µs (point 1101) and at t=471 µs (point 1102). In the mode illustrated in FIG. 11, the minimum waiting interval is greater than the time taken for V(vcr) 901 to first cross V(vcrhnext) 902. Using both criteria, the switch will not be permitted to turn off at the first point 1101 at t=459 µs but will instead turn off at the second point 1102 where V(vcr) 901 next crosses V(vcrhnext) 902 when rising, i.e. at t=471 µs.

The converted energy per cycle remains constant because the energy put into the resonant tank is fully defined by the voltage difference deltaV during the upper switch conduction interval, due to the capacitor across which deltaV is measured being in series with the resonant tank. The energy W put into the resonant tank having a capacitance C over each half cycle is given by:

$$W = C \times deltaV \times Vbus$$

As deltaV is identical at both points 1101, 1102, where t=459 µs and t=471 µs, the energy per cycle level is also identical.

The energy put into the resonant tank can only be delivered to the load or dissipated in the resonant tank, because the energy transfer from the voltage supply line to the resonant tank is fully defined in this way.

FIG. 12 illustrates voltage and current waveforms for the same energy per cycle setting as in FIG. 11, but with a longer minimum wait time value, the result of which is a lower converted power level.

Given that the period between the start and end of each conduction interval can only be adapted in discrete steps due to the natural resonance of the tank and the requirement for a constant energy per cycle setting, it is not always possible to make the desired repetition time for delivering a desired output power. The desired power can instead be delivered by allowing the system to switch between two nearest power levels with a certain duty cycle between them. For example, if the desired power level is half way between the power levels that would result from two adjacent available time periods, the resonant converter may be operated to switch alternately between a first shorter time period and a second longer time period over subsequent switching cycles. In other cases, where the desired power level is closer to one available higher power level than another adjacent lower power level, the resonant converter may be operated to operate according to the higher power level over more cycles than for the lower power level, with the result that the overall average power level is closer to the higher power level.

Figure 13:
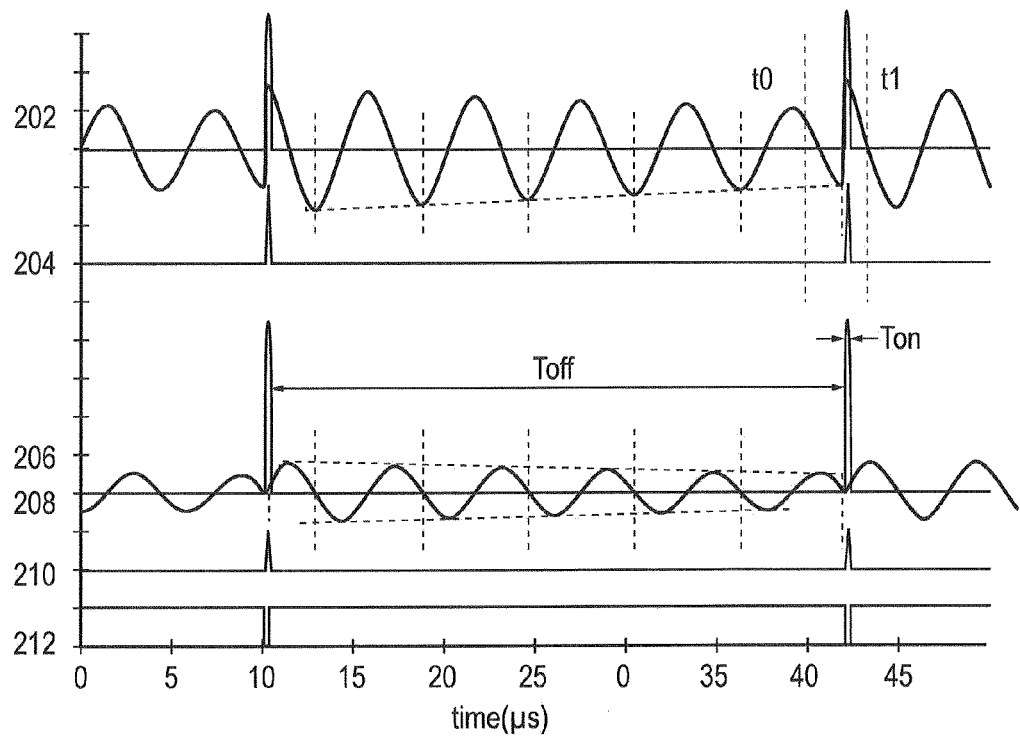
FIG. 13 is a plot of current and voltage waveforms during asymmetrical switching cycles of an LLC converter.

For applications where a DC output voltage is required, an LLC topology is often preferred. Various modes of operation for an LLC converter are known, as described in WO 2005/112238, WO 2009/004582 or WO 2009/098640, the disclosures of which are hereby incorporated by reference herein. Such LLC converters may also be controlled using the aforementioned variables of converted energy per cycle and repetition time. In some modes, one of the switches can be turned on and off more than once during a switching cycle. This has an effect on the PFC for the converter, but the principle of controlling the LLC converter with the two variables can still be applied. The mode shown in FIG. 13 is asymmetrical because the primary current 202 rises from a minimum to a maximum during a short interval, while falling from a maximum to a first minimum during a longer interval. The output current 204 is therefore also asymmetrical and only flowing during conduction of one of the secondary diodes.

Figure 14:
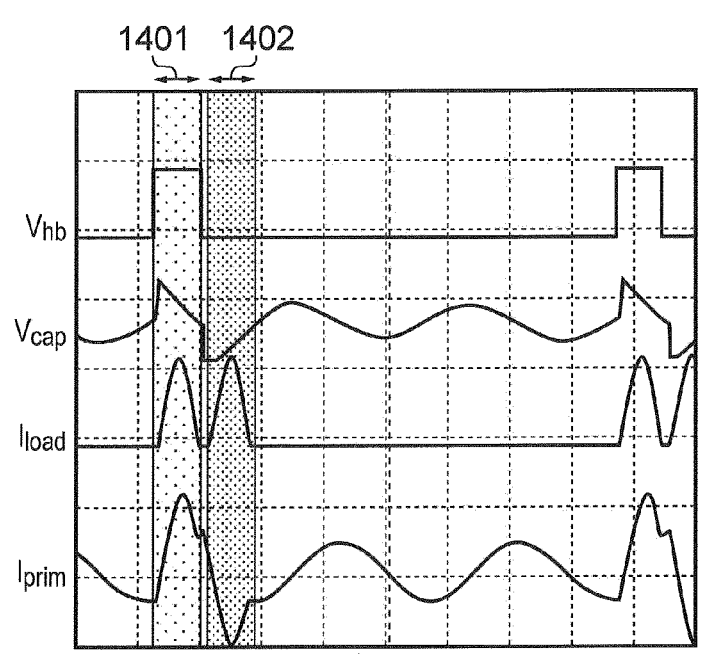
FIGS. 14 and 15 are plots of current and voltage waveforms over conduction intervals for a symmetrical mode of operation of a power converter.

FIG. 14 shows a symmetrical mode of operation from WO 2009/004582, in which during an upper switch conduction interval (where Vhb is high, during interval 1401) the primary current Iprim changes symmetrically to the first part of the lower switch conduction interval (when Vhb is low, during interval 1402). The signal Vcap is defined as Vhb−Vcr, i.e. the difference between the voltages at the node between the switches and the voltage across the sensing capacitor, and is equal to the voltage across the primary side of the transformer (i.e. across inductors Ls and Lm; see for example FIG. 7c). The equal intervals 1401, 1402 indicate a symmetrical mode of operation, although the on times of the two switches are not equal. An integer number of resonance periods of the primary current Iprim are included before the next switching cycle. The converted energy W per cycle is defined similarly to the lighting ballast application described above, as:

$$W = C \times deltaV \times Vbus$$

where deltaV is the voltage difference across the resonant capacitor between the beginning and end of a conduction interval.

For these modes of operation, both the converted energy per cycle setting and the repetition time can be set independently, resulting in a similar mode of operation as described above in relation to the lamp driver ballast application.

Figure 15:
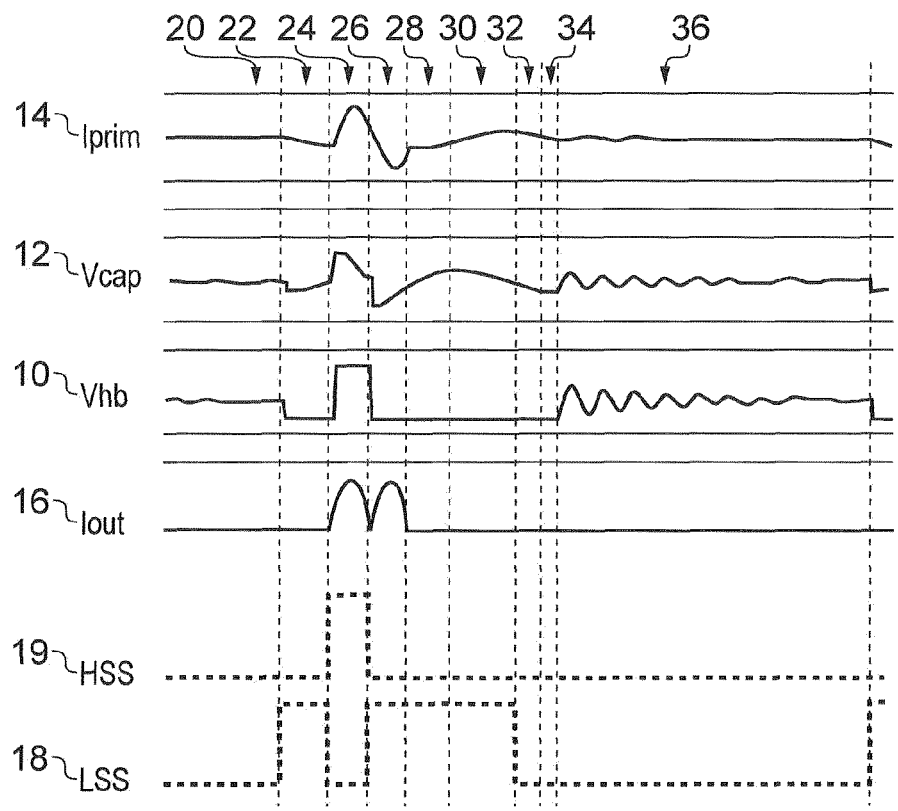

In WO 2009/098640, an extension to the mode of operation illustrated in FIG. 14 is described, as shown in FIG. 15. In this, within a ringing interval, another interval covering intervals 32,34,36,20, is included where both switches are turned off. This additional mode offers the possibility of storing residual energy present in the resonant tank in the resonant capacitor, so that the resonant tank can be made fully currentless. This results in an advantage that the period time can be varied continuously by varying interval 36 while, compared to FIG. 14, no dissipation occurs due to the ringing magnetizing current. After the interval 36 (and 20), the energy is stored back into the magnetizing inductance (interval 22) while the original status before interval 36 started is recovered. This subinterval however introduces an extra switch off and switch on for one of the switches (in this example the lower switch).

The PFC part of a single stage resonant converter can deal with this, because during interval 24 the half bridge node is high and therefore the primary stroke of the PFC occurs (assuming the mains voltage is at a positive half cycle), storing energy from the mains into the PFC inductor, while during the interval 26-34 the energy from the PFC inductor is stored in the Vbus capacitor of the resonant part. During the interval 36 (and 20) both switches are off, but a residual voltage is present at the half bridge node. It is therefore required that Vbus−Vmains remains below this residual voltage in order to prevent disturbing the operation during the interval 36 (and 20) by an undesired current build-up in the PFC inductor. This condition can be fulfilled by defining the operation conditions of the resonant converter.

During interval 22, the lower switch is turned on again, but this will not cause current to build up in the PFC inductor. Effectively there is no additional effect of the second pulse during this interval 22 and the interval where both switches are off. This mode of operation can be replicated using the first and second variables for controlling a resonant converter and PFC.

Figure 1:
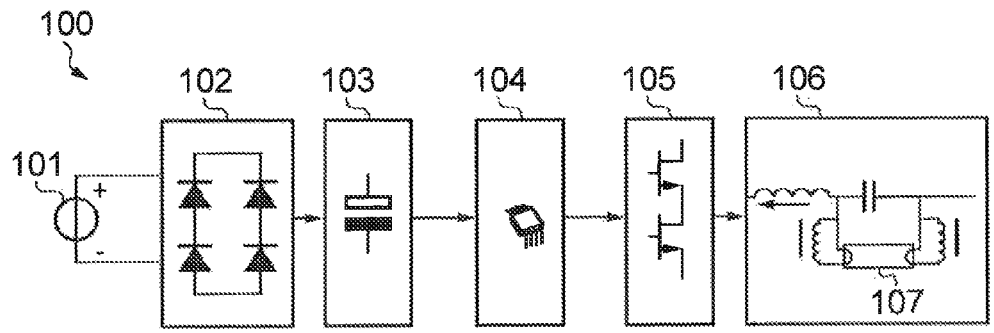
FIG. 1 is a block diagram of a gas discharge lamp driving circuit.
Figure 2A:
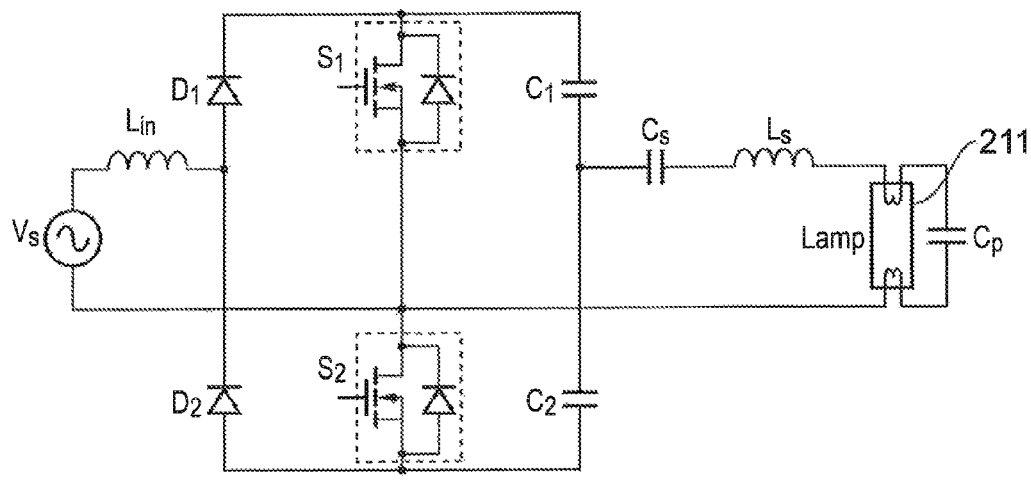
FIGS. 2a and 2b are circuit diagrams of gas discharge lamp driving circuits.
Figure 2B:
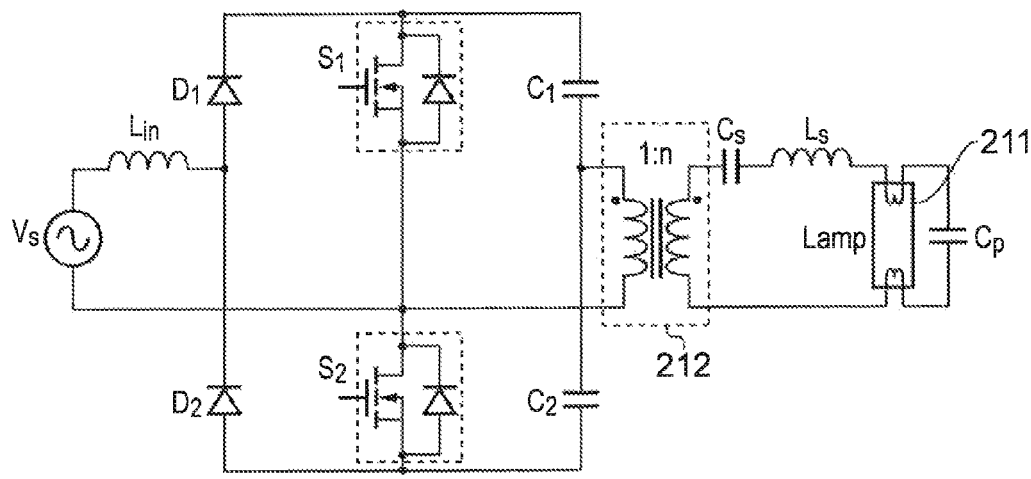
Figure 3:
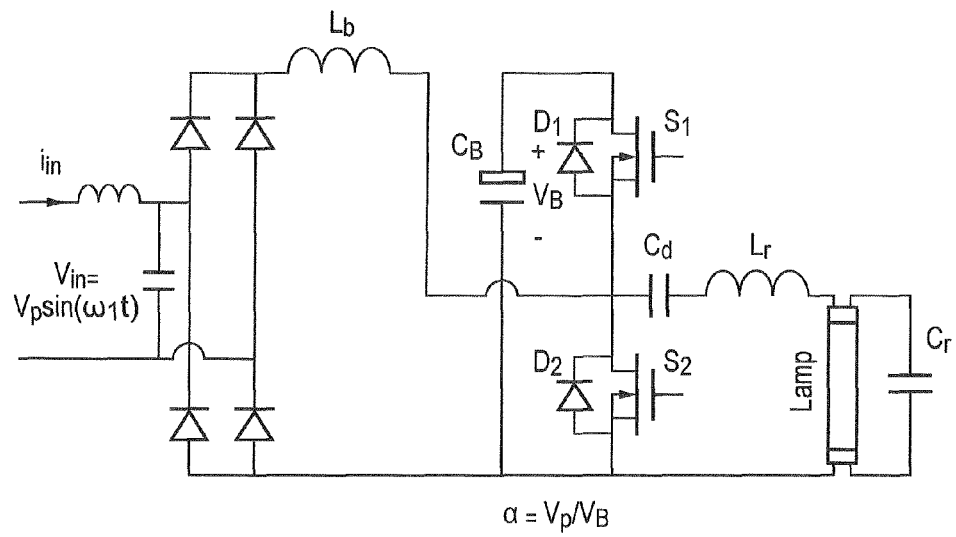
FIGS. 3 to 6 are circuit diagrams of various alternative exemplary single stage PFC resonant converter gas discharge lamp driving circuits.
Figure 4:
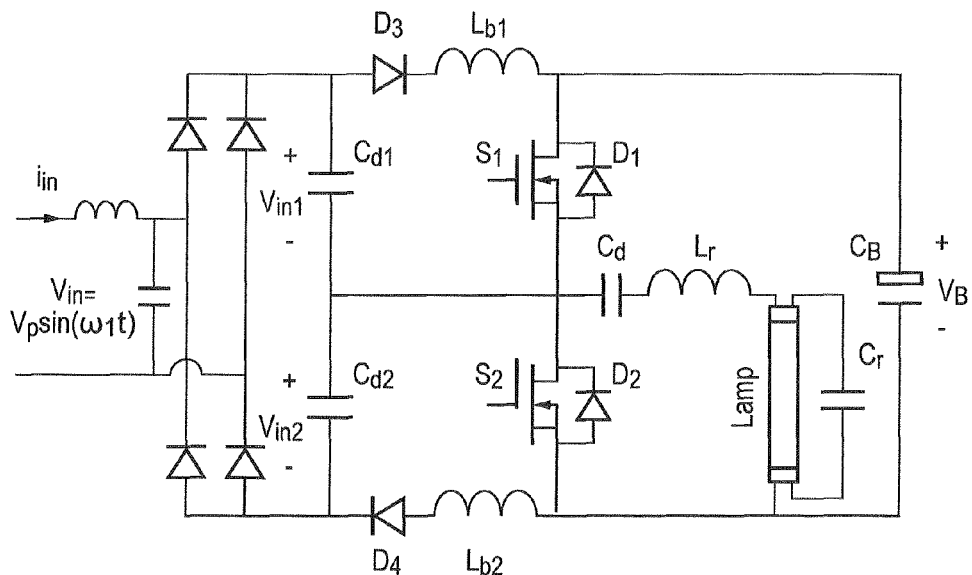
Figure 5:
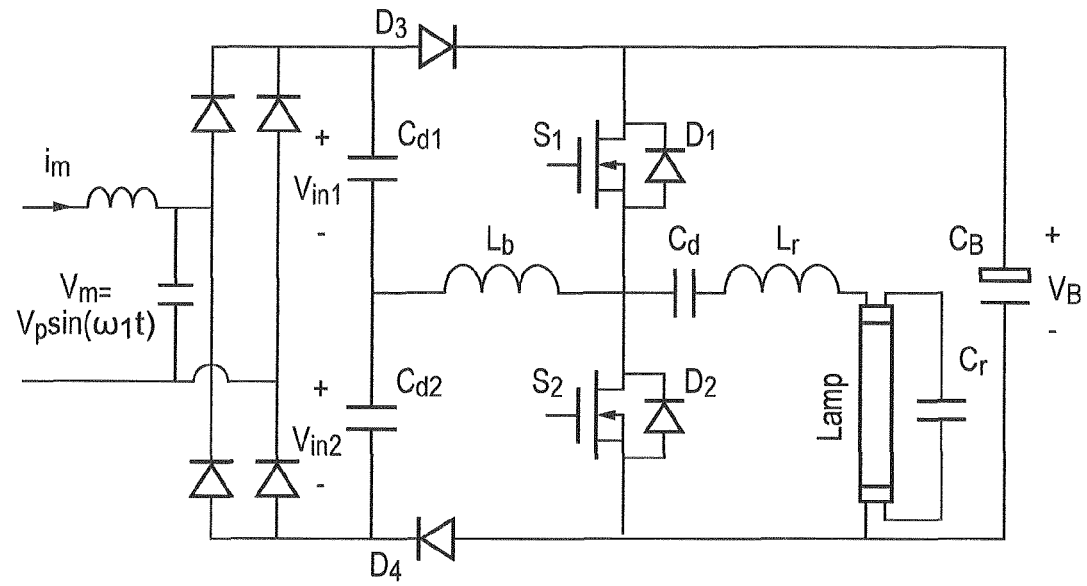
Figure 6A:
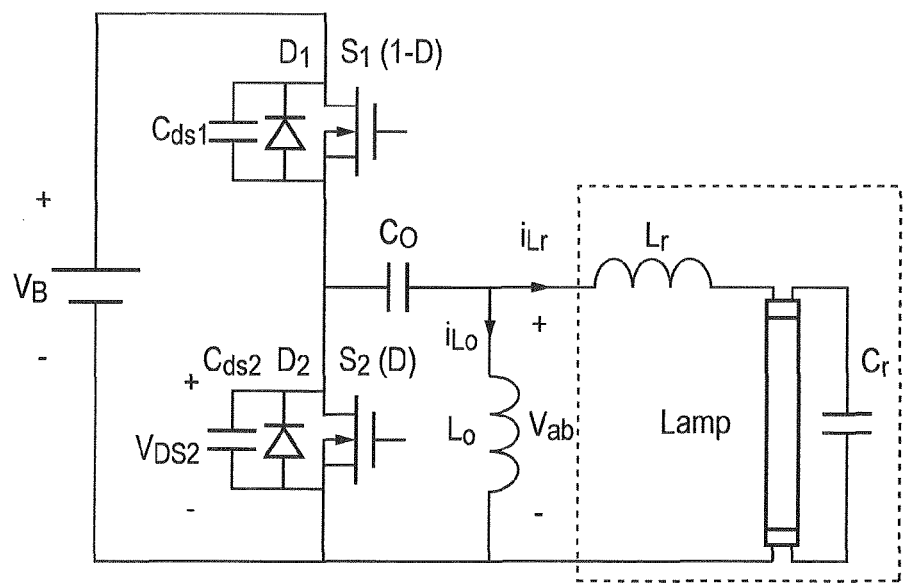
Figure 6B:
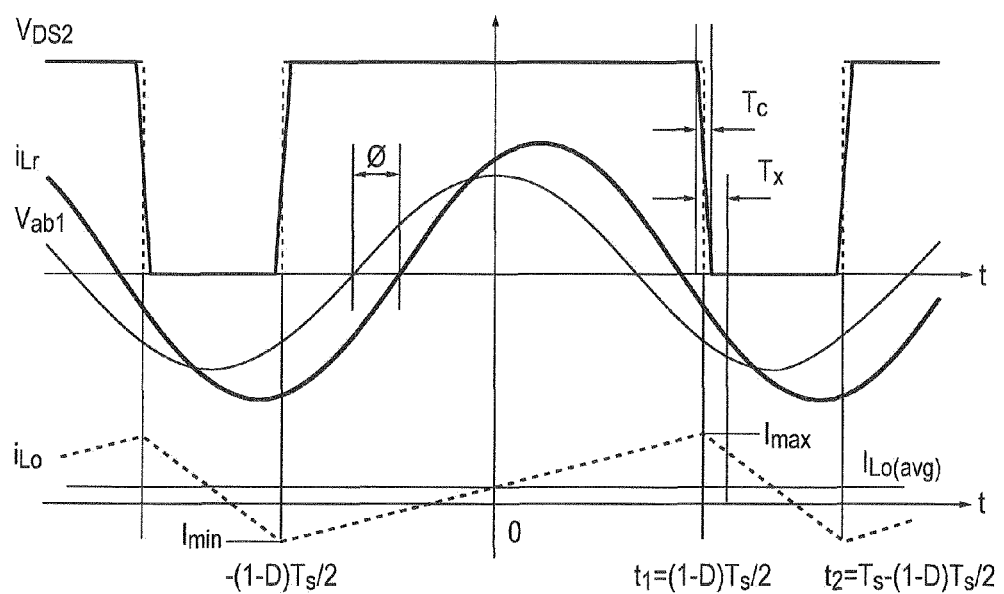

For a bridgeless PFC converter, as for example shown in FIG. 2a, timing is dependent on the sign of the mains voltage. It is therefore necessary to maintain the conditions required to keep the PFC out of CCM operation and preferable also to keep the operation symmetrical between two mains half cycles. The bridgeless PFC may therefore be controlled by means of an asymmetrical duty cycle, where the timing of the switches is inverted for opposing mains half cycles.

A further extension of the mode described in WO 2009/098640 with respect to FIG. 15 is the use of a so-called energy dump interval where, preferably somewhere during interval 26 (for a CCM energy dump) or 28 (for a DCM energy dump), the lower switch is turned off for a short interval. This allows energy to be stored in the magnetizing inductance much faster than into the resonant capacitor. Using this option makes the interval 28,30,32,34 optional.

Figure 16:
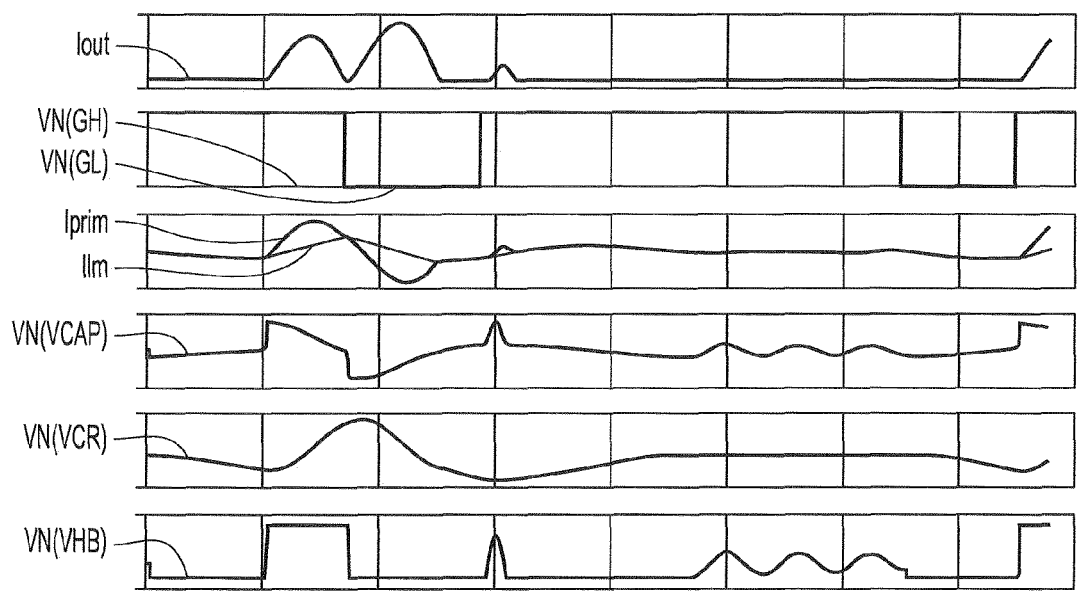
FIGS. 16 and 17 are plots of current and voltage waveforms for operation of a power converter in which an energy dump interval is incorporated during a conduction interval.
Figure 17:
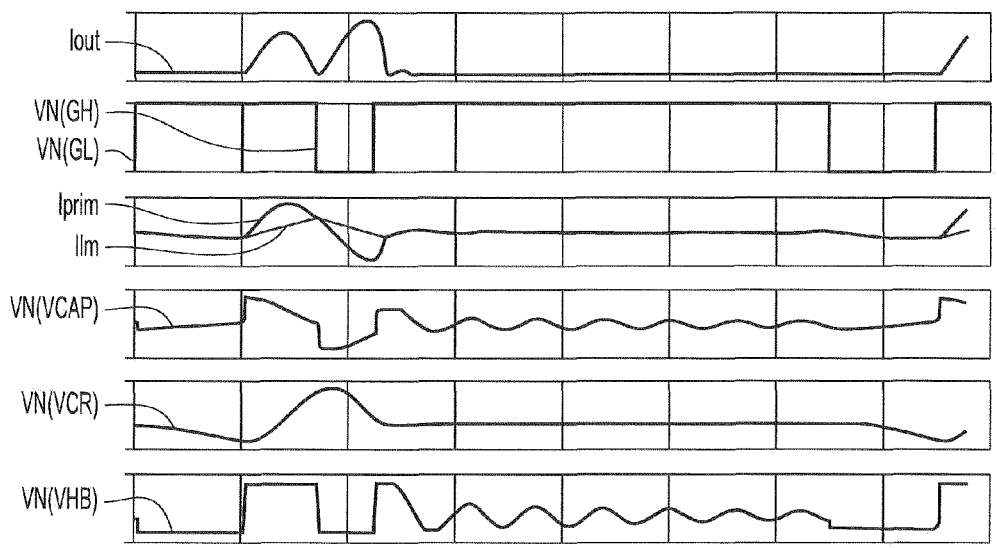

FIG. 16 shows an example of a 'DOM energy dump' mode where the low side switch (GL) is turned off at the start of the energy dump interval (t=14 us) after secondary current has stopped flowing. FIG. 17 shows the 'CCM energy dump' mode where the low side switch (GI) is turned off at the start of the energydump interval (t=11.5 us) while secondary current still flows.

For both FIGS. 16 and 17, the combination with a single stage PFC forces the half bridge voltage to ground or Vbus (depending on the sign of the mains voltage) during the secondary stroke of the PFC. This could conflict with the energy dump interval as Vhb cannot rise. In this case an option could be to use a DCM energy dump and include one full ringing cycle of the magnetizing current (see FIG. 14) before starting the energy dump interval.

Figure 18:
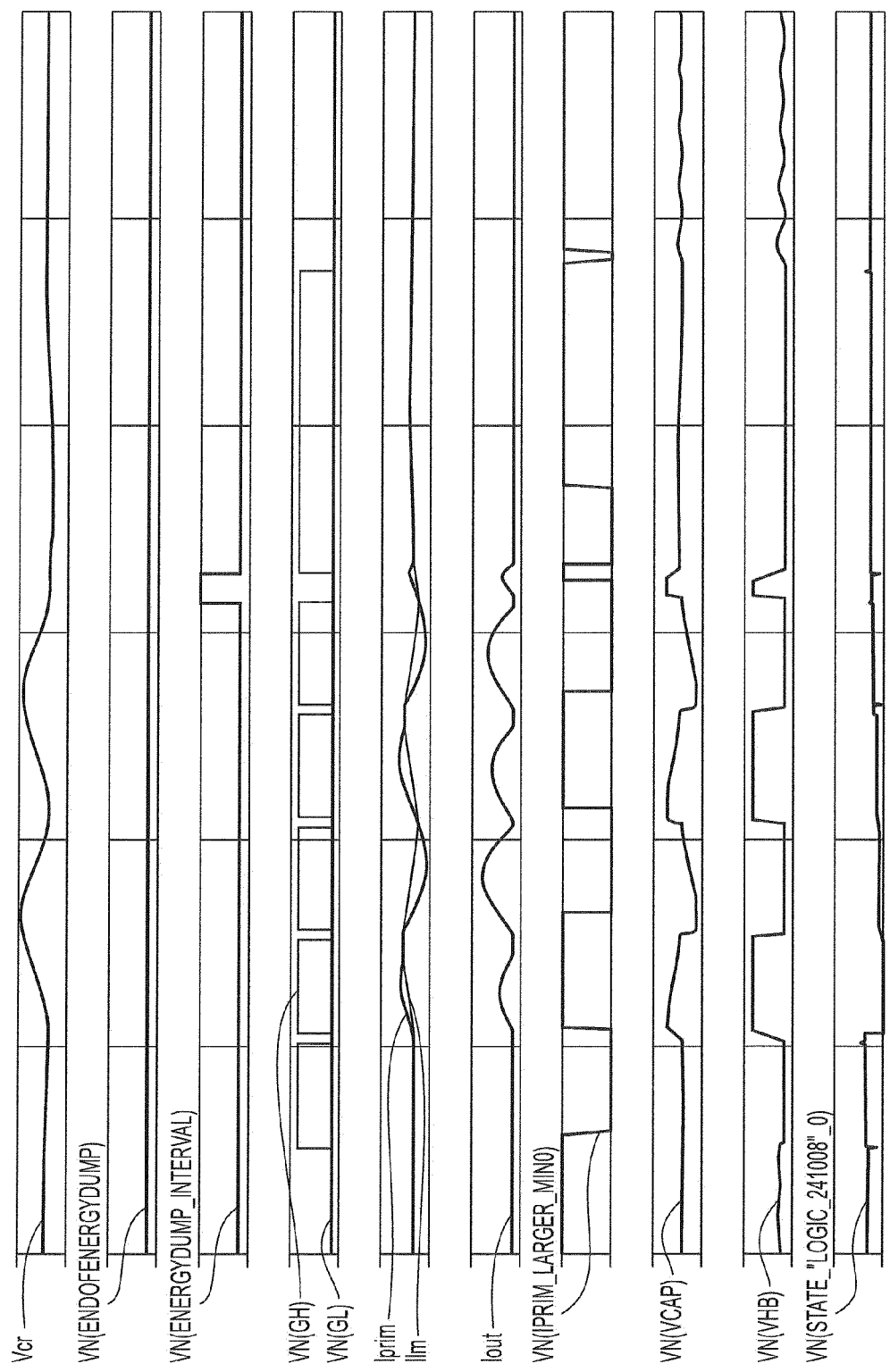
FIG. 18 is a plot of current and voltage waveforms for operation of a power converter where multiple energy conversion cycles are included in each period.

Further options are to include multiple energy conversion cycles within one period. This is shown in FIG. 18 (see signals VN(GH), VN(GL) and VN(VHB)) This option can be used in combination with several of the modes as discussed in relation to FIGS. 13 to 17.

These multiple energy conversion cycles will allow the PFC to operate in CCM during one or more energy conversion cycles (Gh+GI interval), depending on the ratio between input voltage and output voltage of the PFC.

Embodiments of the invention can be applied in lighting ballast applications that requiring power factor correction. Embodiments may also be incorporated into switched mode power supplies with power factor correction, for example for use as adapters for electronic equipment.

Other embodiments are intended to be within the scope of the invention, which is defined by the appended claims.

The invention claimed is:

1. A method of controlling a power output of a resonant power converter comprising first and second switches connected in series between a pair of supply voltage lines, a resonant circuit connected to a node between the first and second switches and to an output connectable to an output electrical load, the resonant circuit comprising an inductor and a capacitor, the method comprising:
   closing the first switch to start a first conduction interval;
   setting a first voltage level;
   setting a first time period; and
   opening the first switch to end the first conduction interval when a voltage across the capacitor crosses the first voltage level and when a time period from closing the first switch exceeds the first time period.

2. The method of claim 1 wherein the first time period is longer than a resonant period of the resonant circuit.

3. The method of claim 1, wherein the resonant power converter has a single stage power factor correction topology.

4. The method of claim 3 wherein the resonant power converter forms a driving circuit for a gas discharge lamp.

5. The method of claim 1, comprising, following opening the first switch to end the first conduction interval:
   closing the second switch to start a second conduction interval;
   setting a second voltage level;
   setting a second time period; and
   opening the second switch to end the first conduction interval when a voltage across the capacitor crosses the second voltage level and when a time period from closing the second switch exceeds the second time period.

6. A resonant power converter comprising first and second switches connected in series between a pair of supply voltage lines, a resonant circuit connected to a node between the first and second switches and to an output connectable to an output electrical load, the resonant circuit comprising an inductor and a capacitor, the resonant power converter further comprising a switching controller configured to operate the first and second switches over successive switching cycles by:
   closing the first switch to start a first conduction interval;
   setting a first voltage level;
   setting a first time period; and
   opening the first switch to end the first conduction interval when a voltage across the capacitor crosses the first voltage level and when a time period from closing the first switch exceeds the first time period.

7. The resonant power converter of claim 6 wherein the first time period is longer than a resonant period of the resonant circuit.

8. The resonant power converter of claim 6, wherein the resonant power converter has a single stage power factor correction topology.

9. The resonant power converter of claim 6, wherein the switching controller is configured to:
   close the second switch to start a second conduction interval after the first switch is opened;
   set a second voltage level;
   set a second time period; and
   open the second switch to end the first conduction interval when a voltage across the capacitor crosses the second voltage level and when a time period from closing the second switch exceeds the second time period.

10. A driving circuit for a gas discharge lamp comprising the resonant power converter of claim 6.

* * * * *